US008804618B2

(12) United States Patent
Hu et al.

(10) Patent No.: US 8,804,618 B2
(45) Date of Patent: Aug. 12, 2014

(54) METHOD AND APPARATUS FOR DETERMINING THE CONFIGURATION MODE OF SPECIAL SUBFRAME AND THE USAGE MODE OF TIME-DOMAIN RESOURCE

(75) Inventors: Haijing Hu, Beijing (CN); Guojun Xiao, Beijing (CN); Yu Ding, Beijing (CN); Ying Wang, Beijing (CN); Jiayi Fang, Beijing (CN); Fei Qin, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 400 days.

(21) Appl. No.: 13/147,790

(22) PCT Filed: Feb. 1, 2010

(86) PCT No.: PCT/CN2010/070448
§ 371 (c)(1),
(2), (4) Date: Aug. 3, 2011

(87) PCT Pub. No.: WO2010/088850
PCT Pub. Date: Aug. 12, 2010

(65) Prior Publication Data
US 2011/0292846 A1  Dec. 1, 2011

(30) Foreign Application Priority Data
Feb. 3, 2009 (CN) .......................... 2009 1 0077903

(51) Int. Cl.
*H04W 4/00* (2009.01)
*H04W 72/00* (2009.01)
(52) U.S. Cl.
CPC ...................................... *H04W 72/00* (2013.01)
USPC ............................ 370/328; 455/448; 455/450
(58) Field of Classification Search
None
See application file for complete search history.

(56) References Cited

U.S. PATENT DOCUMENTS

| 8,054,767 | B2* | 11/2011 | Choi et al. | 370/280 |
|---|---|---|---|---|
| 8,462,672 | B2* | 6/2013 | Kim et al. | 370/280 |
| 8,526,337 | B2* | 9/2013 | Moon et al. | 370/280 |
| 2010/0278083 | A1* | 11/2010 | Kwak et al. | 370/280 |
| 2011/0044215 | A1* | 2/2011 | Kim et al. | 370/280 |
| 2011/0211503 | A1* | 9/2011 | Che et al. | 370/280 |

FOREIGN PATENT DOCUMENTS

| CN | 1454016 A | 11/2003 |
|---|---|---|
| CN | 101541088 A | 9/2009 |
| CN | 101646257 A | 2/2010 |

OTHER PUBLICATIONS

PCT/CN2010/070448, May 13, 2010, International Search Report.

* cited by examiner

*Primary Examiner* — Brian Roberts
(74) *Attorney, Agent, or Firm* — Workman Nydegger

(57) ABSTRACT

A method and an apparatus for determining the configuration mode of special subframe of a cell are provided, and the method includes: receiving notification messages sent from adjacent cells, and the notification messages containing the information indicating the configuration modes of special subframes of the adjacent cells; determining the configuration modes of special subframes of the adjacent cells in accordance with the notification messages; among the possible configuration modes of special subframes of the current cell, selecting preferably a configuration mode of special subframe, which meets the interference requirement of the current cell and has less interference with the adjacent cells, as the current configuration mode of special subframe. The embodiments of the present invention also provide a method and an apparatus for determining the usage mode of the time-domain resource of a cell.

20 Claims, 4 Drawing Sheets

METHOD AND APPARATUS FOR DETERMINING THE CONFIGURATION MODE OF SPECIAL SUBFRAME AND THE USAGE MODE OF TIME-DOMAIN RESOURCE

This application claims the benefit of priority to Chinese Patent Application No. 200910077903.9, entitled "METHOD AND APPARATUS FOR DETERMINING THE CONFIGURATION MODE OF SPECIAL SUBFRAME AND THE USAGE MODE OF TIME-DOMIN RESOURCE", filed on Feb. 3, 2009 with State Intellectual Property Office of PRC, the content of which is incorporated herein by reference in its entirety.

FIELD OF THE INVENTION

The present invention relates to the field of mobile communication technology, and more particularly to a method and an apparatus for determining configuration of special subframe in a cell, and a method and an apparatus for determining usage of time-domain resource in a cell.

BACKGROUND OF THE INVENTION

In LTE-TDD system, thanks to Time Division Duplex mechanism, the proportion of uplink-downlink subframes can be configured flexibly.

The frame structure of the LTE-TDD system is shown in FIG. 1, which includes 10 subframes. The subframes are categorized into normal subframes and special subframes. A normal subframe consists of two time slots, each with a length of 0.5 ms. A special subframe consists of three special time slots, which are respectively Downlink Pilot Time Slot (DwPTS), Uplink Pilot Time Slot (UpPTS) and Guard Period (GP), and a sum of the lengths of the three special time slots is 1 ms.

The LTE-TDD system defines 9 different configurations of the special subframe, as shown in Table 1.

TABLE 1

| Configuration of special subframe | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592\text{-}T_s$ | $2192\text{-}T_s$ | $2560\text{-}T_s$ | $7680\text{-}T_s$ | $2192\text{-}T_s$ | $2560\text{-}T_s$ |
| 1 | $19760\text{-}T_s$ | | | $20480\text{-}T_s$ | | |
| 2 | $21952\text{-}T_s$ | | | $23040\text{-}T_s$ | | |
| 3 | $24144\text{-}T_s$ | | | $25600\text{-}T_s$ | | |
| 4 | $26336\text{-}T_s$ | | | $7680\text{-}T_s$ | $4384\text{-}T_s$ | $5120\text{-}T_s$ |
| 5 | $6592\text{-}T_s$ | $4384\text{-}T_s$ | $5120\text{-}T_s$ | $20480\text{-}T_s$ | | |
| 6 | $19760\text{-}T_s$ | | | $23040\text{-}T_s$ | | |
| 7 | $21952\text{-}T_s$ | | | — | — | — |
| 8 | $24144\text{-}T_s$ | | | — | — | — |

Where the time unit $Ts=1/(15000\times2048)s$.

As seen in Table 1, respective special time slots in the special subframe vary in length with different configurations. In the prior art, cells are not aware of the configuration for the special subframe of each other, which is likely to result in interference between the Base Stations of adjacent cells. For instance, the configuration of the special subframe of any cell in the LTE-TDD system is likely to interference with the communication of adjacent cells, e.g., the DwPTS transmission will probably cause strong interference with the uplink receiving of the adjacent cells.

SUMMARY OF THE INVENTION

Accordingly, embodiments of the present invention on one hand provide a method and an apparatus for determining a configuration of special subframe in a cell, and on the other hand provide a method and an apparatus for determining the usage of time-domain resource in the cell, so as to solve the problem that due to lack of knowledge of the configuration of the special subframe of each other, adjacent cells fail to adopt appropriate configuration of the special subframe or appropriate usage of the time-domain resource to reduce or eliminate the interference between base stations of the adjacent cells.

An embodiment of the present invention provides a method for determining a configuration of special subframe in a cell, including:
   receiving notification information sent from a neighbor cell, which contains information for indicating a configuration of special subframe in the neighbor cell;
   determining the configuration of special subframe in the neighbor cell according to the notification information; and
   selecting, from possible configurations of special subframe in the cell, a configuration special subframe which satisfies an interference requirement of the cell and causes less interference to the neighbor cell, as the configure of special subframe in the cell.

An embodiment of the present invention further discloses a method for determining a usage of time-domain resource in a cell, including:
   receiving notification information sent from a neighbor cell, which contains information for indicating a configuration of special subframe in the neighbor cell;
   acquiring the configuration of special subframe in the neighbor cell according to the information;
   comparing a configuration of special subframe in the cell with the configuration of special subframe in the neighbor cell; and
   setting usage priorities of respective special time slots in a special subframe in the cell according to the comparison result.

An embodiment of the present invention further provides an apparatus for determining a configuration of special subframe in a cell, including:

a first information receiving unit, for receiving notification information sent from a neighbor cell, which contains information for indicating a configuration of special subframe in the neighbor cell;

a first determination unit, for acquiring the configuration of special subframe in the neighbor cell according to the notification information; and a first selection unit, for selecting from possible configurations of special subframe in the cell, a configuration of special subframe which satisfies an interference requirement of the cell and causes less interference to the neighbor cell, as the configure of special subframe in the cell.

An embodiment of the present invention further provides an apparatus for determining a usage of time-domain resource in a cell, including:

a second information receiving unit, for receiving notification information sent from a neighbor cell, which contains information for indicating a configuration of special subframe in the neighbor cell;

a second determination unit, for determining the configuration of special subframe in the neighbor cell according to the notification information; and a second priority setting unit, for comparing the configuration of special subframe in the cell with the configuration of special subframe in the neighbor cell, and for setting usage priorities of respective special time slots in a special subframe in the cell according to the comparison result.

It can be seen from the above technique solutions that the embodiments of the invention provide an approach for mutually informing the configuration of special subframe between adjacent cells. In this approach, the configuration of special subframe that has less interference in the present cell and to the neighbor cell is selected according to the configuration of special subframe in the neighbor cell, so as to effectively reduce the inter-cell interference.

BRIEF DESCRIPTION OF THE DRAWINGS

Technical solutions of the embodiments of the present applicant and/or the prior art will be illustrated more clearly with the following brief description of the drawings. Apparently, the drawings referred in the following description constitute only some embodiments of the invention. Those skilled in the art may obtain some other drawings from these drawings without any inventive labor.

DETAILED DESCRIPTION OF THE INVENTION

The embodiments of the present invention disclose a solution for reducing the interference between adjacent cells by adjusting the usage of the time-domain resource or the configuration of special subframe. In the solution, by acquiring the configuration of special subframe in the neighbor cell from notification information which contains an indicator of the configuration of special subframe in the neighbor cell sent from the neighbor cell, the configuration of special subframe which has less interference with the cell itself and to the neighbor cell is selected as the configuration of special subframe in the cell, or usage priorities of respective time slots are set according to the level of interference to the neighbor cell and the level of interference caused by the neighbor cell.

The technical solutions of the embodiments of the present disclosure will be described clearly and completely in conjunction with the drawings. Apparently, the described embodiments are only some rather than all embodiments of the present disclosure. Any other embodiments obtained from the embodiments of the present disclosure by those skilled in the art without any inventive labor fall within the scope of the invention.

Figure 1:
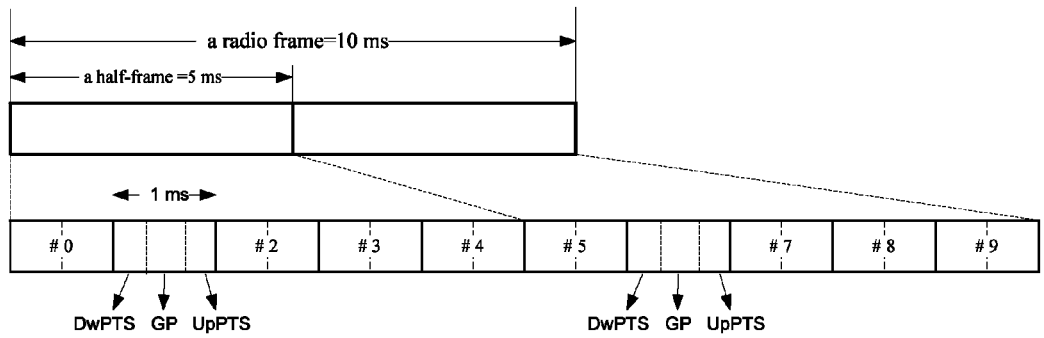
FIG. 1 is a schematic diagram of the frame structure of the LTE-TDD system.
Figure 2:
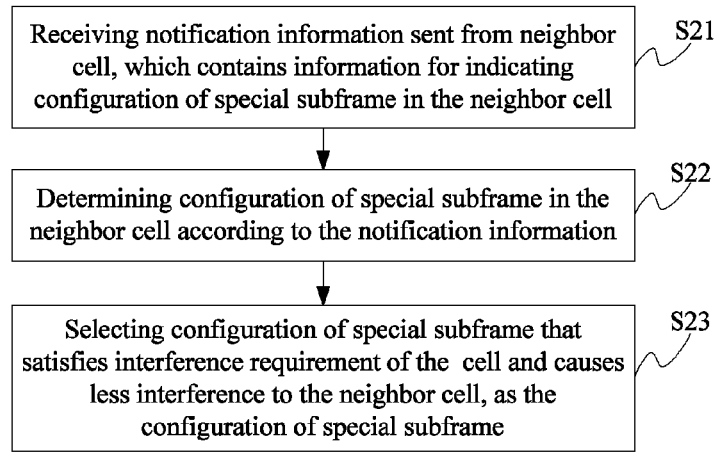
FIG. 2 is a flow chart of a method for determining the configuration of special subframe in a cell provided in an embodiment of the invention.

Referring to FIG. 2, a flow chart of a method for determining the configuration of special subframe of a cell provided in an embodiment of the invention is shown, which includes the steps of:

Step S21: receiving notification information sent from a neighbor cell, which contains information for indicating the configuration of special subframe in the neighbor cell.

Step S22: determining the configuration of special subframe in the neighbor cell according to the notification information.

The configuration of special subframe in the neighbor cell is determined according to the information for indicating the configuration of special subframe in the neighbor cell.

Step S23: selecting the configuration of special subframe which satisfies an interference requirement of the cell and causes less interference to the neighbor cell, as the configuration of special subframe in the cell.

Preferably selecting, from predetermined possible configurations, the configuration of special subframe which can satisfy the requirement that the downlink transmission of the present cell has less interference with the uplink transmission and causes less interference to the neighbor cell, as the configuration of special subframe in the present cell.

The notification information in Step S21 may be sent when the neighbor cell is initially established or when the configuration of special subframe in the neighbor cell is changed. The notification information may be a separate message or may be a parameter carried in existing Serving Cell Information, the existing Serving Cell Information including physical layer ID (identification), cell ID tracking area number, broadcasted PLMN (Public Land Mobile Network), center frequency, and so on. Table 2 shows the composition of the Serving Cell Information in the existing LTE-LDD system.

TABLE 2

| Information type | Information description |
|---|---|
| Physical layer ID | The Physical layer ID of a cell |
| Cell ID | The ID of a Cell |
| Tracking area code | Code of the tracking area |

TABLE 2-continued

| Information type | Information description |
| --- | --- |
| Broadcasted PLMN | Information of all operator networks shared in a cell |
| >PLMN ID | The ID of an operator network |
| Frequency point | The center frequency at which a cell operates |
| Uplink transmission bandwidth | The uplink transmission bandwidth of a cell |
| Downlink transmission bandwidth | The downlink transmission bandwidth of a cell |
| Subframe allocation | The Configuration of the uplink and downlink subframe in TDD |

In an embodiment of the present invention, a new type of Serving Cell Information is defined, the structure of which is shown as Table 3. Compared with the existing Serving Cell Information, a field of "special subframe configuration" for indicating the configuration of special subframe in the cell is added, and the configuration can be any one of the 9 uplink and downlink configurations shown in Table 1.

TABLE 3

| Information type | Information description |
| --- | --- |
| Physical layer ID | The Physical layer ID of a cell |
| Cell ID | The ID of a Cell |
| Tracking area code | Code of the tracking area |
| Broadcasted PLMN | Information of all operator networks shared in a cell |
| >PLMN ID | The ID of an operator network |
| Frequency point | The center frequency at which a cell operates |
| Uplink transmission bandwidth | The uplink transmission bandwidth of a cell |
| Downlink transmission bandwidth | The downlink transmission bandwidth of a cell |
| Subframe allocation | The Configuration of the uplink and downlink subframe in TDD |
| Special subframe configuration | The configuration of special subframe, which can be one of the configurations Nos. 0-8 |

In the above Step S23, the way for determining the interferences of respective time slots in the special subframe to the present cell is the same as in the prior art and will not be described in details herein. Several principles for selecting the configuration which causes less interference to the neighbor cell are provided in the present invention as follows:

1. the length of GP in the present cell should be greater than that in the neighbor cell as much as possible, otherwise the DwPTS of the present cell may cause a strong interference with the UpPTS or the uplink subframe of the neighbor cell; and
2. if the DwPTS of the present cell corresponds to the GP or UpPTS of the neighbor cell, the subframe may cause a strong interference with the uplink transmission of the neighbor cell.

The selecting of the configuration of special subframe from a plurality of predetermined configurations of special subframe can be performed in accordance with the above principles, which includes:

preferably selecting the configuration of special subframe in which the length of GP is greater than or equal to that of the neighbor cell and the DwPTS does not correspond to the GP or UpPTS of the neighbor cell.

Furthermore, after an appropriate configuration is selected as the configuration of the special subframe, appropriate usage priorities may be further set according to the situation of respective special time slots in the special subframe, so as to reduce the setting and avoid the interference between base stations of adjacent cells.

Several principles for setting the usage priorities are shown as follows:

A. if the length of GP in the present cell is greater than or equal to that in the neighbor cell, the usage priority of the UpPTS in the present cell can be set based on the level of interference with the UpPTS and uplink subframe of the present cell caused by the DwPTS of the neighbor cell: the higher the level of interference suffered by the UpPTS is, the lower the usage priority of the UpPTS is; and when the interference level is greater than a predetermined threshold, the UpPTS is set to be a disabled time slot; and B. if the GP or UpPTS of the present cell corresponds to the DwPTS of the neighbor cell, the data transmitted in the UpPTS is subjected to the risk of being interfered by the DwPTS of the neighbor cell, and in this case the usage priority of the UpPTS of the present cell can also be set based on the level of interference with the UpPTS and uplink subframe of the present cell caused by the DwPTS of the neighbor cell: the higher the level of interference suffered by the UpPTS is, the lower the usage priority of the UpPTS is; and when the interference level is greater than the predetermined threshold, the UpPTS is set to be a disabled time slot.

After setting the usage priorities of respective special time slots according to the above principles, the cell selects special time slots for uplink or downlink application from high usage priority to low priority; time slots with higher priority would be used as much as possible in the uplink or downlink application, while time slots with lower priority would be used selectively according to system load. For example, the time slots with lower priority would be used as less as possible when the system load is small, and be used accordingly when the system load is large.

It should be noted that in this embodiment the neighboring or adjacency is mutual, and each of the cells in the network needs to send the notification information for indicating its own configuration of special subframe and receive the notification information sent from adjacent cells for indicating the configuration of special subframe in the adjacent cells. Therefore, the notification information received in the above Step S21 may be sent after the neighbor cell receives additional notification information.

The embodiment of the invention defines an approach for mutually informing the configuration of special subframe between adjacent cells, thereby selecting a configuration having less interference with the present cell and the neighbor cell based on comparison of the configuration of special subframe, so as to effectively reduce the interference between cells and improve the capacity and efficiency of the system.

Figure 3:
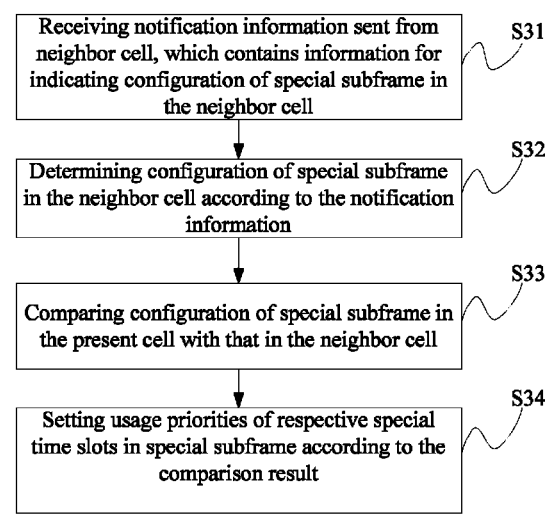
FIG. 3 is a flow chart of a method for determining the usage of time-domain resource in a cell provided in an embodiment of the invention.

In addition, an embodiment of the invention further provides a method for determining the usage of the time-domain resource in a cell. In this method, by means of the configuration of special subframe in the neighbor cell known from notification information sent from the neighbor cell, which contains the information for indicating the configuration of special subframe in the neighbor cell, the usage priorities of respective time slots are set according to the level of interference caused by the neighbor cell and the level of interference imposed on the neighbor cell. The specific process is shown in FIG. 3, including the steps of:

Step S31: receiving notification information sent from a neighbor cell, the notification information containing the information for indicating the configuration of special subframe in the neighbor cell.

Step S32: determining the configuration of special subframe in the neighbor cell according to the notification information.

Step S33: comparing the configuration of special subframe in the present cell with the configuration of special subframe in the neighbor cell.

Step 34: setting the usage priorities of respective special time slots in the special subframe according to the comparison result.

The above steps S31 and S32 are substantially the same as the steps S21 and S22.

In Step S33, comparing the configuration of special subframe in the present cell with the configuration of special subframe in the neighbor cell includes comparing the correspondence relationship and the length of each special time slot in the special subframes. Furthermore, regarding the principles for setting the usage priorities of respective special time slots according to the comparison result in step S34, reference may be made to the relevant contents of the approach for determining the configuration of special subframe as described previously.

It should be noted that in this embodiment, if the level of interference imposed by the configuration of special subframe on the neighbor cell or the level of interference caused by the neighbor cell is greater than the predetermined threshold, the configuration of special subframe can be modified by: selecting, from the predetermined possible configurations, the configuration which can satisfy the requirement that the downlink transmission of the present cell causes less interference with the uplink transmission and causes less interference to the neighbor cell, as the configuration of special subframe of the present cell. Regarding the specific process for modifying the configuration of special subframe, reference may be made to the relevant contents of the approach for determining the configuration of special subframe as described previously.

The embodiment of the invention defines an approach for mutually informing the configuration of special subframe between adjacent cells, thereby setting the usage priorities of respective special time slots of the cells and controlling the usage of the special time slots, so that respective special time slots can be used properly, thus effectively reducing interference between cells and improving the capacity and efficiency of the system.

The method for determining the configuration of special subframe and the method for determining the usage of the time-domain resource disclosed in the above embodiment can be combined with each other.

Furthermore, the embodiments of the invention also provide apparatuses for implementing the above methods.

Figure 4:
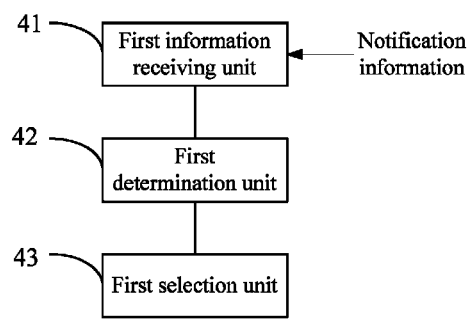
FIG. 4 is a schematic structural diagram of an apparatus for determining the configuration of special subframe in a cell provided in an embodiment of the invention.

An apparatus for determining the configuration of special subframe of a cell is provided in an embodiment of the present invention, the structure of which is shown in FIG. 4, including: a first information receiving unit 41, a first determination unit 42 and a first selection unit 43, in which:

the first information receiving unit 41 is adapted to receive notification information sent from a neighbor cell, which contains the information for indicating the configuration of special subframe in the neighbor cell;

the first determination unit 42 is adapted to determine the configuration of special subframe in the neighbor cell according to the notification information; and the first selection unit 43 is adapted to preferably select, from the possible configurations of special subframe in the present cell, the configuration of the special subframe which can satisfy the interference requirement of the present cell and causes less interference to the neighbor cell, as the configuration of special subframe.

The possible configurations of special subframe are as shown in the table 1. The selection unit 43 selects the configuration of special subframe according to predetermined principles, which may make reference to the content of the methods for determining the configuration of special subframe as described previously, and will not be described in details herein.

The notification information is sent when the neighbor cell is initially established or when the configuration of special subframe in the neighbor cell is changed, or when the neighbor cell receives notification information sent from the present cell, in which the present cell is not the neighbor cell. For clarity, an example is illustrated in the following:

Cell 1 and cell 2 are cells adjacent to each other, and the cell 1 sends notification information to cell 2 when the cell 1 is initially established or when the configuration of special subframe of the cell 1 is changed or when the cell 1 receives notification information sent from the cell 2.

The notification information may be a separate message, or may be Serving Cell Information which contains a field for indicating the configuration of special subframe. Regarding structure, reference may be made to the contents about the method as described previously.

Figure 5:
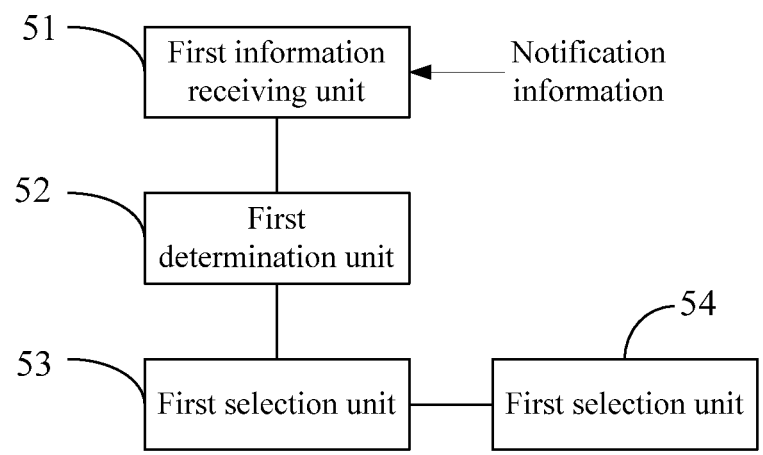
FIG. 5 is a schematic structural diagram of another apparatus for determining the configuration of special subframe in a cell provided in an embodiment of the invention.

The structure of another apparatus for determining the configuration of special subframe of a cell provided by an embodiment of the invention is shown in FIG. 5, which includes a first information receiving unit 51, a first determination unit 52, a selection unit 53 and a first priority setting unit 54, in which:

the functions of the first information receiving unit 51, the first determination unit 52 and the selection unit 53 are similar to the first information receiving unit 42, the first determination unit 42 and the first selection unit 43 as described previously; the first priority setting unit 54 is adapted to set the usage priorities of respective special time slots in the special subframe according to the situations of the interference caused by the neighbor cell and the interference imposed on the neighbor cell. For example, when the GP or UpPTS in the special subframe corresponds to the DwPTS of the neighbor cell, the usage priority of the UpPTS is set according to the measured level of interference suffered by the UpPTS.

It should be noted that the first priority setting unit 54 sets the usage priorities according to predetermined setting principles, regarding which reference may be made to the contents of the method as described previously.

Figure 6:
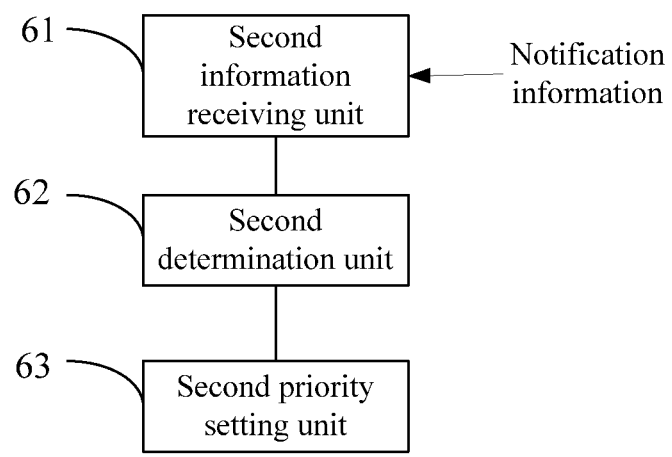
FIG. 6 is a schematic structural diagram of an apparatus for determining the usage of the time-domain resource in a cell provided in an embodiment of the invention.

An embodiment of the present invention further provides an apparatus for determining the usage of the time-domain resource, the structure of which is shown in FIG. 6, including: a second information receiving unit 61, a second determination unit 62 and a second priority setting unit 63, in which:

the second information receiving unit 61 is adapted to receive notification information sent from a neighbor cell, the notification information containing the information for indicating the configuration of special subframe in the neighbor cell;

the second determination unit 62 is adapted to determine the configuration of special subframe in the neighbor cell according to the notification information; and the second priority setting unit 63 is adapted to compare the configuration of special subframe in the present cell with the configuration of special subframe in the neighbor cell, and set the usage priorities of respective special time slots in the special subframe according to the comparison result.

The functions of the second information receiving unit 61 and the second determination unit 62 are substantially the same as that of the first information receiving unit 41 and the first determination unit 42 described previously, and the function of the second priory setting unit 63 is substantially the same as that of the first priority setting unit 54 described previously.

It should be noted that the notification information is sent when the neighbor cell is initially established or when the configuration of special subframe in the neighbor cell is changed, or when the neighbor cell receives notification information sent from the present cell, where the present cell does not refer to the neighbor cell, but refers to the cell in which the apparatus locates.

The notification information may be a separate message, or may be Serving Cell Information which contains a field indicating the configuration of special subframe. Regarding structure, reference may be made to the contents about the method as described previously.

Figure 7:
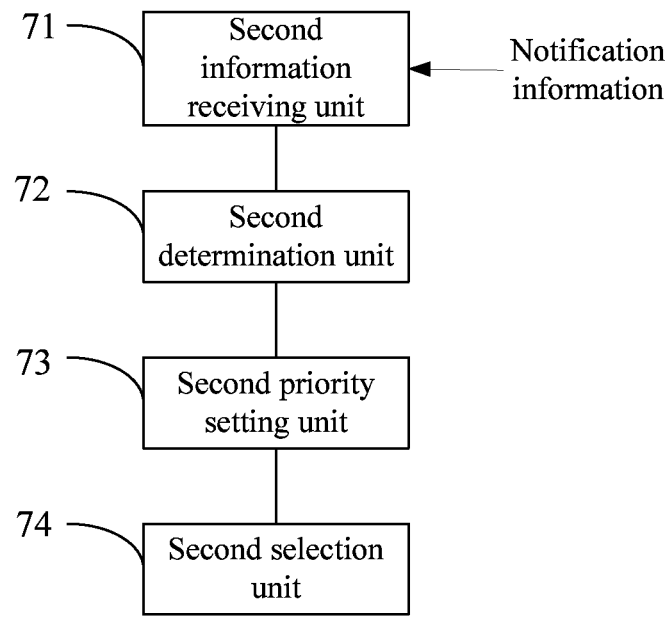
FIG. 7 is a schematic structural diagram of another apparatus for determining the usage of the time-domain resource in a cell type of an embodiment of the invention.

FIG. 7 shows the structure of another apparatus for determining the usage of the time-domain resource, which includes a second information receiving unit 71, a second determination unit 72, a second priority setting unit 73 and a second selection unit 74, in which:

the functions of the second information receiving unit 71, the second determination unit 72 and the second priority setting unit 73 are substantially the same as the functions of the second information receiving unit 61, the second determination unit 62 and the second priority setting unit 63; and the second selection unit 74 is adapted to preferably select, when the level of interference imposed by the configuration of special subframe on the neighbor cell or the level of interference caused by the neighbor cell is greater than the predetermined threshold, from the predetermined possible configurations, the configuration of special subframe which can satisfy the requirement that the downlink transmission of the present cell causes less interference with the uplink transmission and causes less interference with the neighbor cell, as the configuration of special subframe.

Figure 8:
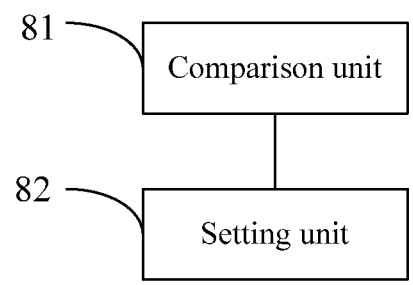
FIG. 8 is a schematic structural diagram of a second priority setting unit in the embodiment shown in FIG. 6 or FIG. 7.

FIG. 8 shows the structure of each of the second priority setting unit 63 and the second priority setting unit 73 described above. As seen from FIG. 8, each of the second priority setting unit 63 and the second priority setting unit 73 includes a comparison unit 81 and a setting unit 82, where:

the comparison unit 81 is adapted to compare the configuration of special subframe in the present cell with the configuration of special subframe in the neighbor cell, and specifically, to compare the correspondence relationship and the length relationship of the special time slots in the special subframe between the present cell and the neighbor cell;

the setting unit 82 is adapted to acquire the comparison result (which refers to the correspondence relationship and the length relationship of the special time slots) from the comparison unit 81, and to set a lower usage priority for the DwPTS in the special subframe if the DwPTS corresponds to the GP or UpPTS of the neighbor cell, or set a higher usage priority for the DwPTS in the special subframe if the DwPTS does not correspond to the GP or UpPTS of the neighbor cell; and if the GP or UpPTS in the special subframe corresponds to the DwPTS of the neighbor cell or if the length of GP in the special subframe is greater than or equal to the length of GP in the neighbor cell, to measure the level of interference suffered by the UpPTS and set the UpPTS to be a disabled time slot if the measured level of interference is greater than the predetermined threshold.

The embodiments of the invention are described in a progressive way, each of which emphasizes the differences from others, and the same or similar elements among the embodiments can be referred to each other. Since the apparatus disclosed in the embodiments corresponds to the method therein, the description thereof is relatively simple, and for relevant matters references may be made to the description of the method.

It should be understood by those skilled in the art that the information, message and signal can be represented by any one of many different processes and techniques. For example, the message and information mentioned above can be represented by voltage, current, electromagnetic wave, magnetic field or magnetic particles, optical field, or any combination thereof.

The skilled in the art should further realize that various units and algorithm steps described in connection with the disclosed embodiments herein may be implemented in electronic hardware, computer software, or the combination thereof. To illustrate the interchangeable usage of hardware and software, the above description has shown, in a general way, the configurations and the steps of various embodiments in terms of functions. Whether these functions are implemented in hardware or software depends on particular applications and design constraints of respective solutions. The skilled in the art can implement the described functions in different ways for different applications, and the implementations should not be regarded as falling without the scope of the invention.

The steps of the exemplary methods or algorithms can be implemented with hardware, software modules executed by a processor, or a combination thereof. The software modules may reside in a Random Access Memory (RAM), an internal memory, a Read Only Memory (ROM), an Electrically Programmable ROM, an Electrically-Erasable Programmable ROM, a register, a hard disk, a removable disk drive, CD-ROM, or other types of storage media well known in the prior art.

With the above descriptions of the disclosed embodiments, the skilled in the art may practice or use the present invention. Various modifications to the embodiments are apparent for the skilled in the art. The general principle suggested herein can be implemented in other embodiments without departing from the spirit or scope of the invention. Therefore, the present invention should not be limited by the embodiments disclosed herein, but has the widest scope that is conformity with the principle and the novel features disclosed herein.

The invention claimed is:

1. A method for determining a configuration of special subframe in a cell, comprising:
   receiving notification information sent from a neighbor cell, which contains information for indicating a configuration of special subframe in the neighbor cell;
   determining the configuration of special subframe in the neighbor cell according to the notification information; and
   selecting the configuration of special subframe in the cell according to the notification information previously received from the neighbor cell, wherein the selected configuration of special subframe in the cell has less interference with the cell and has less interference with the neighbor cell.

2. The method according to claim 1, wherein the step of receiving notification information sent from a neighbor cell comprises: receiving the notification information which is sent by the neighbor cell when the neighbor cell is initially established or when the configuration of special subframe in the neighbor cell is changed.

3. The method according to claim 1, wherein the selected configuration is a configuration in which a length of guard period GP is greater than or equal to a length of GP in the configuration of special subframe in the neighbor cell and a level of interference caused by a transmission in Downlink Pilot Time Slot DwPTS of the neighbor cell to a transmission in Uplink Pilot Time Slot UpPTS of the cell is less than a predetermined threshold.

4. The method according to claim 1, wherein the selected configuration, and the selected configuration comprises:
   a configuration in which DwPTS does not correspond to GP or UpPTS of the neighbor cell; or
   a configuration in which the DwPTS corresponds to the GP or UpPTS of the neighbor cell and a length of the DwPTS is shorter.

5. The method according to claim 1, further comprising:
   if GP or UpPTS in the configuration of subframe in the cell corresponds to DwPTS of the neighbor cell, measuring a level of interference suffered by the UpPTS in the configuration of special subframe in the cell; and
   if the level of interference suffered by the UpPTS in the configuration of subframe in the cell is greater than a predetermined threshold, setting the UpPTS in the configuration of subframe in the cell to be a disabled time slot.

6. A method for determining a usage of time-domain resource in a cell, comprising:
   receiving notification information sent from a neighbor cell, which contains information for indicating a configuration of special subframe in the neighbor cell;
   determining the configuration of special subframe in the neighbor cell according to the notification information;
   setting usage priorities of respective special time slots in a special subframe of the cell according to the notification information.

7. The method according to claim 6, wherein the step of receiving notification information sent from a neighbor cell comprises: receiving the notification information which is sent by the neighbor cell when the neighbor cell is initially established or when the configuration of special subframe in the neighbor cell is changed.

8. The method according to claim 6, wherein the step of setting usage priorities of respective special time slots in the special subframe of the cell according to the notification information comprises:
   if DwPTS in the special subframe of the cell corresponds to GP or UpPTS of the neighbor cell, setting a lower usage priority for the DwPTS in the special subframe of the cell; if the DwPTS in the special subframe of the cell does not correspond to the GP or UpPTS of the neighbor cell, setting a higher usage priority for the DwPTS in the special subframe of the cell; and
   if the GP or UpPTS in the special subframe of the cell corresponds to the DwPTS of the neighbor cell or a length of the GP in the special subframe of the cell is greater than or equal to a length of the GP of the neighbor cell, measuring a level of interference suffered by the Up PTS in the special subframe of the cell; and if the level of interference suffered by the Up PTS in the special subframe of the cell is greater than a determined threshold, setting the UpPTS in the special subframe of the cell to be a disabled time slot.

9. The method according to claim 6, further comprising:
   if a level of interference with the neighbor cell caused by the configuration of special subframe in the cell is greater than a predetermined threshold or a level of interference caused by the neighbor cell to the configuration of special subframe in the cell is greater than the predetermined threshold, selecting, from predetermined possible configurations, the configuration which satisfies a requirement that a downlink transmission of the cell has less interference with an uplink transmission and causes less interference to the neighbor cell, as the configuration of special subframe.

10. The method according to claim 6, further comprising:
   using time slots with lower priority selectively according to system load.

11. An apparatus for determining a configuration of special subframe in a cell, comprising:
   a first information receiving unit for receiving notification information sent from a neighbor cell, the notification information containing information for indicating a configuration of special subframe in the neighbor cell;
   a first determination unit for determining the configuration of special subframe in the neighbor cell according to the notification information; and
   a first selection unit for selecting the configuration of special subframe in the cell in accordance with the notification information previously received from the neighbor cell, wherein the selected configuration of special subframe in the cell has less interference with the cell and has less interference with the neighbor cell.

12. The apparatus according to claim 11, wherein the notification information is sent when the neighbor cell is initially established or when the configuration of special subframe in the neighbor cell is changed.

13. The apparatus according to claim 11, wherein the first selection unit is adapted to select one of the following configuration of special subframe as the configuration of special subframe in the cell: a configuration in which a length of guard period GP is greater than or equal to a length of GP in the configuration of special subframe in the neighbor cell and a level of interference caused by a transmission in Downlink Pilot Time Slot DwPTS of the neighbor cell to a transmission in Uplink Pilot Time Slot UpPTS of the cell is less than a predetermined threshold; or a configuration in which the DwPTS does not correspond to the GP or UpPTS of the neighbor cell; or a configuration in which the DwPTS corresponds to the GP or UpPTS of the neighbor cell and the length of the DwPTS is shorter.

14. The apparatus according to claim 11, further comprising:
   a first priority setting unit for measuring a level of interference suffered by UpPTS in the configuration of special subframe in the cell when GP or Up PTS in a special subframe of the cell corresponds to DwPTS of the neighbor cell, and for setting an usage priority of the UpPTS according to the level of interference suffered by the UpPTS in the configuration of special subframe in the cell.

15. An apparatus for determining a usage of time-domain resource, comprising:
   a second information receiving unit for receiving notification information sent from a neighbor cell, the notification information containing information for indicating a configuration of special subframe in the neighbor cell;
   a second determination unit for determining the configuration of special subframe in the neighbor cell according to the notification information; and a second priority setting unit for setting usage priorities of respective special time slots in a special subframe of the cell according to the notification information.

16. The apparatus according to claim 15, wherein the notification information is sent when the neighbor cell is initially established or when the configuration of special subframe in the neighbor cell is changed.

17. The apparatus according to claim 16, wherein the second priority setting unit comprises:

a comparison unit for comparing the configuration of special subframe in the cell with the configuration of special subframe in the neighbor cell; and a setting unit for acquiring a comparison result from the comparing unit, and if the comparison result shows that DwPTS in the special subframe of the cell corresponds to GP or UpPTS of the neighbor cell, setting a lower usage priority for the DwPTS in the special subframe of the cell; or if the comparison result shows that the DwPTS in the special subframe of the cell does not correspond to the GP or UpPTS of the neighbor cell, setting a higher usage priority for the DwPTS in the special subframe of the cell; and if the comparison result shows that the GP or UpPTS in the special subframe of the cell corresponds to the DwPTS of the neighbor cell, or a length of GP in the special subframe of the cell is greater than or equal to a length of GP of the neighbor cell, measuring a level of interference suffered by the UpPTS in the special subframe of the cell, and setting the UpPTS in the special subframe of the cell to be a disabled time slot when the level of interference suffered by the UpPTS in the special subframe of the cell is greater than a predetermined threshold.

18. The apparatus according to claim 15, further comprising:

a second selection unit for selecting, when a level of interference caused by the configuration of special subframe in the cell to the neighbor cell or a level of interference caused by the neighbor cell to the configuration of special subframe in the cell is greater than a predetermined threshold, a configuration mode which satisfies a requirement that a downlink transmission of the cell has less interference with an uplink transmission and causes less interference to the neighbor cell, from predetermined possible configurations, as the configuration of special subframe.

19. The apparatus according to claim 18, wherein the second priority setting unit comprises:

a comparison unit for comparing the configuration of special subframe in the cell with the configuration of special subframe in the neighbor cell; and a setting unit for acquiring a comparison result from the comparing unit, and if the comparison result shows that DwPTS in the special subframe of the cell corresponds to GP or UpPTS of the neighbor cell, setting a lower usage priority for the DwPTS in the special subframe of the cell; or if the comparison result shows that the DwPTS in the special subframe of the cell does not correspond to the GP or UpPTS of the neighbor cell, setting a higher usage priority for the DwPTS in the special subframe of the cell; and if the comparison result shows that the GP or UpPTS in the special subframe of the cell corresponds to the DwPTS of the neighbor cell, or a length of GP in the special subframe of the cell is greater than or equal to a length of GP of the neighbor cell, measuring a level of interference suffered by the UpPTS in the special subframe of the cell, and setting the UpPTS in the special subframe of the cell to be a disabled time slot when the level of interference suffered by the UpPTS in the special subframe of the cell is greater than a predetermined threshold.

20. The apparatus according to claim 15, wherein the second priority setting unit comprises:

a comparison unit for comparing the configuration of special subframe in the cell with the configuration of special subframe in the neighbor cell; and a setting unit for acquiring a comparison result from the comparing unit, and if the comparison result shows that DwPTS in the special subframe of the cell corresponds to GP or UpPTS of the neighbor cell, setting a lower usage priority for the DwPTS in the special subframe of the cell; or if the comparison result shows that the DwPTS in the special subframe of the cell does not correspond to the GP or UpPTS of the neighbor cell, setting a higher usage priority for the DwPTS in the special subframe of the cell; and if the comparison result shows that the GP or UpPTS in the special subframe of the cell corresponds to the DwPTS of the neighbor cell, or a length of GP in the special subframe of the cell is greater than or equal to a length of GP of the neighbor cell, measuring a level of interference suffered by the UpPTS in the special subframe of the cell, and setting the UpPTS in the special subframe of the cell to be a disabled time slot when the level of interference suffered by the UpPTS in the special subframe of the cell is greater than a predetermined threshold.

\* \* \* \* \*